United States Patent
Hoshina et al.

(10) Patent No.: US 11,908,630 B2
(45) Date of Patent: Feb. 20, 2024

(54) SOLID ELECTROLYTIC CAPACITOR USING A DOPED CONDUCTIVE POLYMER

(71) Applicant: TOKIN Corporation, Miyagi (JP)

(72) Inventors: Yusuke Hoshina, Miyagi (JP); Masami Ishijima, Miyagi (JP); Tadamasa Asami, Miyagi (JP); Yasuhisa Sugawara, Miyagi (JP)

(73) Assignee: TOKIN CORPORATION, Miyagi (JP)

( * ) Notice: Subject to any disclaimer, the term of this patent is extended or adjusted under 35 U.S.C. 154(b) by 0 days.

(21) Appl. No.: 17/659,620

(22) Filed: Apr. 18, 2022

(65) Prior Publication Data
US 2022/0344103 A1    Oct. 27, 2022

(30) Foreign Application Priority Data
Apr. 23, 2021 (JP) ................ 2021-073214

(51) Int. Cl.
*H01G 9/025* (2006.01)
*H01G 9/00* (2006.01)

(52) U.S. Cl.
CPC ......... *H01G 9/0036* (2013.01); *H01G 9/025* (2013.01)

(58) Field of Classification Search
CPC ....... H01G 9/025; H01G 9/0036; H01G 9/028
See application file for complete search history.

(56) References Cited

U.S. PATENT DOCUMENTS

| | | | | |
|---|---|---|---|---|
| 5,729,428 A * | 3/1998 | Sakata | ............. | H01G 11/56 29/25.03 |
| 2008/0259529 A1* | 10/2008 | Takatani | ............. | H01G 9/028 427/80 |
| 2010/0079928 A1* | 4/2010 | Harada | ............. | H01G 9/0029 361/523 |
| 2016/0163466 A1* | 6/2016 | Naito | ............. | H01G 9/0425 29/25.03 |
| 2020/0373089 A1* | 11/2020 | Shi | ............. | H01G 9/028 |
| 2021/0287857 A1* | 9/2021 | Lin | ............. | H01G 9/028 |

FOREIGN PATENT DOCUMENTS

JP         H0669082 A        3/1993

* cited by examiner

*Primary Examiner* — David M Sinclair
(74) *Attorney, Agent, or Firm* — McCoy Russell LLP (57) ABSTRACT

A solid electrolytic capacitor according to an aspect includes an anode body made of a valve metal, a dielectric layer formed on the anode body, a solid electrolyte layer formed on the dielectric layer, and a cathode body layer formed on the solid electrolyte layer. The solid electrolyte layer includes a first layer containing a first conductive polymer doped with a monomolecular dopant, and a second conductive polymer composed of a self-doped-type conductive polymer containing a plurality of side chains containing a functional group, the functional group being able to be doped, and a second layer formed on the first layer and containing a third conductive polymer doped with a polymer dopant; and the first conductive polymer is in contact with the third conductive polymer (the second layer).

1 Claim, 5 Drawing Sheets

SOLID ELECTROLYTIC CAPACITOR USING A DOPED CONDUCTIVE POLYMER

CROSS-REFERENCE TO RELATED APPLICATION

The present application claims priority to Japanese Patent Application No. 2021-73214 filed on Apr. 23, 2021. The entire contents of the above-listed application are hereby incorporated by reference for all purposes.

BACKGROUND

The present disclosure relates to a solid electrolytic capacitor and a method for manufacturing a solid electrolytic capacitor.

In recent years, solid electrolytic capacitors have been widely used in various fields such as the field of electronic apparatuses. Japanese Unexamined Patent Application Publication No. H6-69082 discloses a technology for a solid electrolytic capacitor in which a conductive polymer is used as a solid electrolyte.

SUMMARY

The solid electrolytic capacitor disclosed in Japanese Unexamined Patent Application Publication No. H6-69082 uses a conductive polymer as a solid electrolyte. For example, a conductive polymer can be formed on a dielectric layer by using chemical polymerization. However, when a conductive polymer is formed on a dielectric layer by using chemical polymerization, the dielectric layer could be damaged and hence the insulation thereof could deteriorate. When the insulation of the dielectric layer deteriorates as described above, it may cause a dielectric breakdown.

For example, it is possible to suppress the deterioration of the insulation of a dielectric layer by reducing the number of times chemical polymerization is performed. However, when the number of times chemical polymerization is performed is reduced, the conductivity of the solid electrolyte layer decreases, causing a problem that the equivalent series resistance (ESR: Equivalent Series Resistance) of the solid electrolytic capacitor increases.

In view of the above-described problem, an object of the present disclosure is to provide a solid electrolytic capacitor capable of suppressing the deterioration of the insulation of a dielectric layer and suppressing the increase in the ESR thereof, and a method for manufacturing such a solid electrolytic capacitor.

A first exemplary aspect is a solid electrolytic capacitor including: an anode body made of a valve metal; a dielectric layer formed on the anode body; a solid electrolyte layer formed on the dielectric layer; and a cathode body layer formed on the solid electrolyte layer. The solid electrolyte layer includes: a first layer containing a first conductive polymer doped with a monomolecular dopant, and a second conductive polymer composed of a self-doped-type conductive polymer containing a plurality of side chains containing a functional group, the functional group being able to be doped; and a second layer formed on the first layer and containing a third conductive polymer doped with a polymer dopant, and the first conductive polymer is in contact with the third conductive polymer.

Another exemplary aspect is a method for manufacturing a solid electrolytic capacitor including: forming a dielectric layer on an anode body made of a valve metal; forming a solid electrolyte layer on the dielectric layer; and forming a cathode body layer on the solid electrolyte layer. The forming of the solid electrolyte layer includes: forming a first layer by forming, after forming a first conductive polymer on the dielectric layer by using chemical polymerization, a second conductive polymer composed of a self-doped-type conductive polymer; and forming a second layer containing a third conductive polymer on the first layer by using a suspension containing a conductive polymer doped with a polymer dopant, and when the solid electrolyte layer is formed, it is formed so that the first conductive polymer comes into contact with the third conductive polymer.

According to the present disclosure, it is possible to provide a solid electrolytic capacitor capable of suppressing the deterioration of the insulation of a dielectric layer and suppressing the increase in the ESR thereof, and a method for manufacturing such a solid electrolytic capacitor.

The above and other objects, and features of the present disclosure will become more fully understood from the detailed description given hereinbelow and the accompanying drawings which are given by way of illustration only, and thus are not to be considered as limiting the present disclosure.

DETAILED DESCRIPTION

Embodiments according to the present disclosure will be described hereinafter with reference to the drawings.

Figure 1:
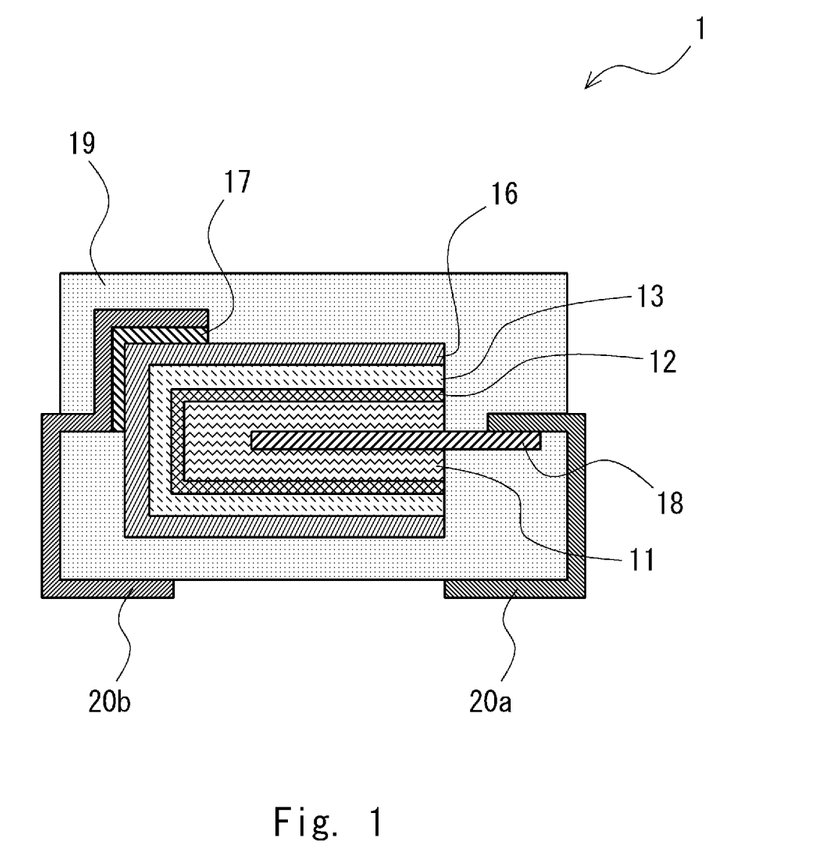
FIG. 1 is a cross-sectional diagram of a solid electrolytic capacitor according to an embodiment.

FIG. 1 shows a cross-sectional diagram of a solid electrolytic capacitor according to an embodiment. As shown in FIG. 1, the solid electrolytic capacitor 1 according to this embodiment includes an anode body 11, a dielectric layer 12, a solid electrolyte layer 13, a cathode layer 16, a conductive adhesive 17, an anode lead 18, an exterior resin 19, and lead frames 20*a* and 20*b*.

The anode body 11 is formed by using a porous valve metal. For example, the anode body 11 can be formed by using at least one substance selected from tantalum (Ta), aluminum (Al), niobium (Nb), titanium (Ti), zirconium (Zr), hafnium (Hf), and tungsten (W), or using an alloy of these metals. In particular, the anode body 11 may be formed by using at least one substance selected from tantalum (Ta), aluminum (Al), and niobium (Nb), or using an alloy of these metals. The anode 11 is formed, for example, by using a plate, foil, or wire-like valve metal, a sintered body containing fine particles of a valve metal, or a porous valve metal that has been subjected to a surface-enlarging treatment by etching.

The dielectric layer 12 is formed on the surface of the anode body 11. For example, the dielectric layer 12 can be formed by anodizing the surface of the anode body 11. For example, the surface of the anode body 11 is porous, and the dielectric layer 12 is also formed in pores of the porous surface. For example, in the case where tantalum is used for the anode body 11, it is possible to form a tantalum oxide film (i.e., the dielectric layer 12) on the surface of the anode body 11 by anodizing the anode body 11. For example, it is possible to adjust the thickness of the dielectric layer 12 by changing the voltage of the anodizing process.

The solid electrolyte layer 13 is formed on the dielectric layer 12. That is, the solid electrolyte layer 13 is formed so as to be in contact with the entire surface of the dielectric layer 12. Details of the solid electrolyte layer 13 will be described later.

The cathode layer 16 is formed on the solid electrolyte layer 13. The cathode layer 16 can be formed, for example, by laminating a carbon layer and a silver layer. Note that the carbon layer and the silver layer are merely examples, and the material constituting the cathode layer 16 is not limited to any particular material, provided that the material is electrically conductive.

As described above, in the solid electrolytic capacitor 1 according to this embodiment, the dielectric layer 12, the solid electrolyte layer 13, and the cathode layer 16 are laminated one after another on the anode body 11. The anode body 11 includes the anode lead 18, and the anode lead 18 is connected to the lead frame 20a. For example, the anode lead 18 is connected to the lead frame 20a by welding. Further, the cathode layer 16 is connected to the lead frame 20b through the conductive adhesive 17. The solid electrolytic capacitor 1 according to this embodiment, except for parts of the two lead frames 20a and 20b (i.e., only parts of the two lead frames 20a and 20b are exposed to the outside), is covered by the exterior resin 19.

Figure 2:
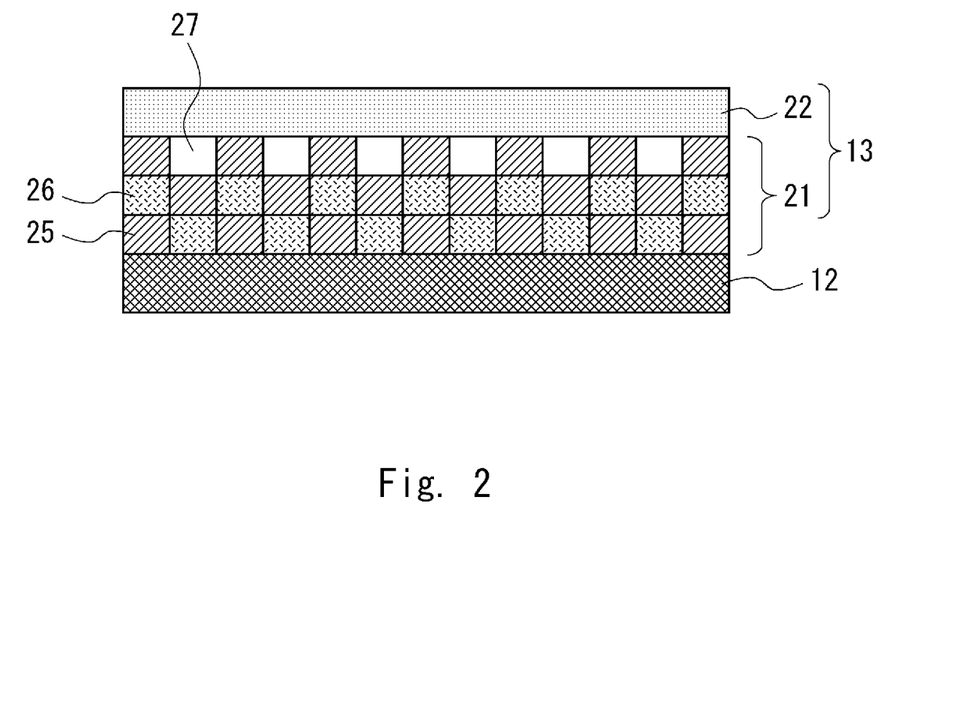
FIG. 2 is a cross-sectional diagram showing an example of a solid electrolyte layer included in a solid electrolytic capacitor according to an embodiment.

Next, details of the solid electrolyte layer 13 included in the solid electrolytic capacitor 1 according to this embodiment will be described. FIG. 2 is a cross-sectional diagram of an example of the solid electrolyte layer included in the solid electrolytic capacitor according to this embodiment, and is an enlarged cross-sectional diagram of a part of the solid electrolytic capacitor 1 shown in FIG. 1, including the dielectric layer 12 and the solid electrolyte layer 13. Note that, in FIG. 2, first and second conductive polymers 25 and 26, which constitute the solid electrolyte layer 13, are shown in a schematic manner in order to explain features of the present disclosure. The same applies to FIGS. 3 to 5.

As shown in FIG. 2, the solid electrolyte layer 13 includes a first layer 21 and a second layer 22. The first layer 21 contains a first conductive polymer (CH) 25 and a second conductive polymer (SD) 26. A conductive polymer doped with a monomolecular dopant can be used for the first conductive polymer 25. For example, at least one substance selected from a group consisting of polypyrrole, polythiophene, polyaniline, and derivatives thereof can be used for the first conductive polymer 25.

As for the second conductive polymer 26, a self-doped-type conductive polymer containing a plurality of side chains containing a functional group that can be doped can be used. For example, the second conductive polymer 26 is a self-doped-type conductive polymer that is composed of polypyrrole, polythiophene, or polyaniline, and that contains a plurality of side chains containing a functional group that can be doped. That is, at least one conductive polymer selected from these self-doped-type conductive polymers can be used for the second conductive polymer 26.

The second layer 22 is formed on the first layer 21. The second layer 22 contains a third conductive polymer (SL). As the third conductive polymer (hereinafter also referred to as a third conductive polymer 22), a conductive polymer doped with a polymer dopant can be used. For example, at least one substance selected from a group consisting of polypyrrole, polythiophene, polyaniline, and derivatives thereof, doped with a polymer dopant containing a sulfonic acid group, can be used for the third conductive polymer 22. As the polymer dopant, for example, polystyrene sulfonate, its derivative, or a copolymer of polystyrene sulfonate can be used.

The solid electrolytic capacitor 1 according to this embodiment is formed so that the first conductive polymer 25 is in contact with the third conductive polymer (the second layer) 22. FIG. 2 shows an example of a structure of the solid electrolytic capacitor 1 in which the first conductive polymer 25 is in contact with the third conductive polymer (the second layer) 22, and voids 27 partially exist at the interface between the first layer 21 and the second layer 22.

In this embodiment, the first conductive polymer 25 is formed by using chemical polymerization. For example, after the first conductive polymer 25 is formed by using chemical polymerization, the formed first conductive polymer 25 is washed by using a solvent (water, alcohol, etc.), so that unreacted substances and the residue of the oxidizer and the like can be removed. After the washing, the first conductive polymer 25 becomes a porous (sponge-like) substance in which there are a large number voids. Therefore, the first conductive polymer 25 has a low bulk density, and in this state, the electrical resistance of the first conductive polymer 25 is high.

In this embodiment, the second conductive polymer 26 is formed after the first conductive polymer 25 is formed. Therefore, it is possible to fill some of the voids of the first conductive polymer 25 with the second conductive polymer 26, and thereby to form the first layer 21 in which the first and second conductive polymers 25 and 26 are integrated with each other. Note that since the second conductive polymer 26 is a self-doped-type conductive polymer, the overall density of the first layer 21 can be increased and hence the electrical resistance of the first layer 21 can be reduced. In particular, after the washing, there are large number of voids in the first conductive polymer 25, the second conductive polymer 26 can easily infiltrate into the voids of the first conductive polymer 25 (i.e., the voids of the first conductive polymer 25 can be easily impregnated with the second conductive polymer 26).

Further, this embodiment is formed so that the first conductive polymer 25 is in contact with the third conductive polymer (the second layer) 22. For example, it is possible to make the first conductive polymer exposed on the surface of the first layer 21 by adjusting the concentration and/or the amount of the second conductive polymer 26 when the second conductive polymer 26 is infiltrated into the voids of the first conductive polymer 25 (i.e., the voids of the first conductive polymer 25 are impregnated with the second conductive polymer 26). By forming the third conductive polymer 22 on the surface of the first layer 21 in this state, the first conductive polymer 25 can be brought into contact with the third conductive polymer (the second layer) 22.

For example, after the second conductive polymer 26 is infiltrated into the voids of the first conductive polymer 25 (i.e., the voids of the first conductive polymer 25 are impregnated with the second conductive polymer 26), the first conductive polymer 25 can be exposed on the surface of the first layer 21 by washing the second conductive polymer 26 with a solvent (water, alcohol, etc.). By forming the third conductive polymer 22 on the surface of the first layer 21 in this state, the first conductive polymer 25 can be brought into contact with the third conductive polymer (the second layer) 22.

For example, after the first layer 21 is formed, it may be immersed in a suspension containing the third conductive polymer, so that the third conductive polymer 22 can be formed on the surface of the first layer 21.

Further, after the first conductive polymer 25 is formed, it may be immersed in a suspension containing the third conductive polymer, and then the second conductive polymer 26 may be injected into the voids of the first conductive polymer 25. Even in this case, it is possible to form the solid electrolyte layer 13 in which the first conductive polymer 25 and the third conductive polymer (the second layer) 22 are in contact with each other.

Although the first conductive polymer 25 is formed by using chemical polymerization, the amount of the first conductive polymer 25 may be as small as possible in order to suppress the deterioration of the insulation of the dielectric layer 12. For example, the amount of the first conductive polymer 25 can be minimized by adjusting the concentration(s) of a monomer(s) used in the chemical polymerization, the concentration of the oxidizer, the number of times of polymerization, and/or other factors. In particular, it is possible to minimize the number of times chemical polymerization is performed when the first conductive polymer 25 is formed (e.g., to reduce the number of times chemical polymerization is performed to one).

Figure 3:
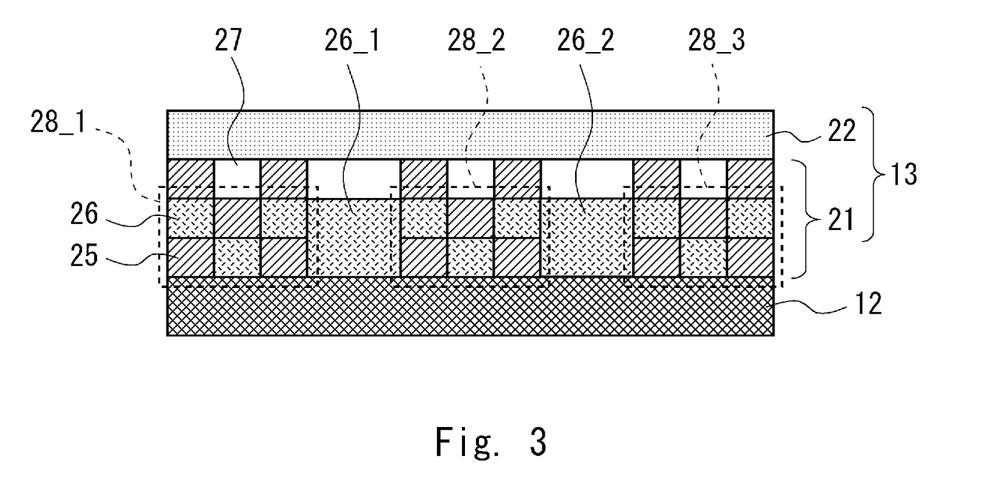
FIG. 3 is a cross-sectional diagram showing an example of a solid electrolyte layer included in a solid electrolytic capacitor according to an embodiment.

In this embodiment, the first conductive polymer 25 may be formed in an island-like pattern on the surface of the dielectric layer 12. Specifically, as shown in FIG. 3, the first conductive polymer 25 may cover the upper surface (the front surface) of the dielectric layer 12 in an island-like pattern. Note that the island-like pattern means that the first conductive polymer 25 is not uniformly formed on the dielectric layer 12, but is formed in a discontinuous manner on the dielectric layer 12, so that the first conductive polymer 25 does not cover the entire upper surface of the dielectric layer 12.

In the example shown in FIG. 3, the second conductive polymer 26 is provided so as to cover (or surround) the periphery of the first conductive polymer 25 which is formed in an island-like pattern. Further, in the example shown in FIG. 3, the voids of the first conductive polymer 25 are impregnated with the second conductive polymer 26. In FIG. 3, the second conductive polymer 26 covering the periphery of the first conductive polymer 25 formed in the island-like pattern is indicated by reference numerals 26_1 and 26_2. Further, the parts where the voids of the first conductive polymer 25 are impregnated with the second conductive polymer 26 are indicated by reference numerals 28_1 to 28_3. That is, in the parts indicated by the reference numerals 28_1 to 28_3, the porous (sponge-like) first conductive polymer 25 is formed in an island-like pattern, and the voids of this porous (sponge-like) first conductive polymer 25 are impregnated with the second conductive polymer 26. The same applies to the other drawings.

Further, although this embodiment is formed so that the first conductive polymer 25 is in contact with the third conductive polymer (the second layer) 22, it may be formed so that the second conductive polymer 26 is in contact with the third conductive polymer (the second layer) 22.

Figure 4:
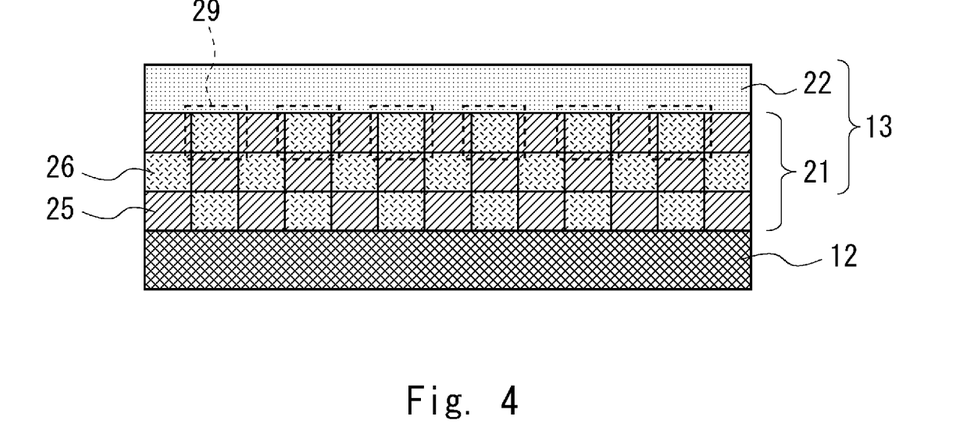
FIG. 4 is a cross-sectional diagram showing an example of a solid electrolyte layer included in a solid electrolytic capacitor according to an embodiment.

That is, although there are voids 27 at the interface between the first and second layers 21 and 22 in a scattered manner in the structure shown in FIG. 2, the second conductive polymer 26 may be disposed in the voids 27 as shown in FIG. 4 (the parts in which the second conductive polymer 26 is disposed in the voids 27 are indicated by broken lines denoted by a reference numeral 29).

Figure 5:
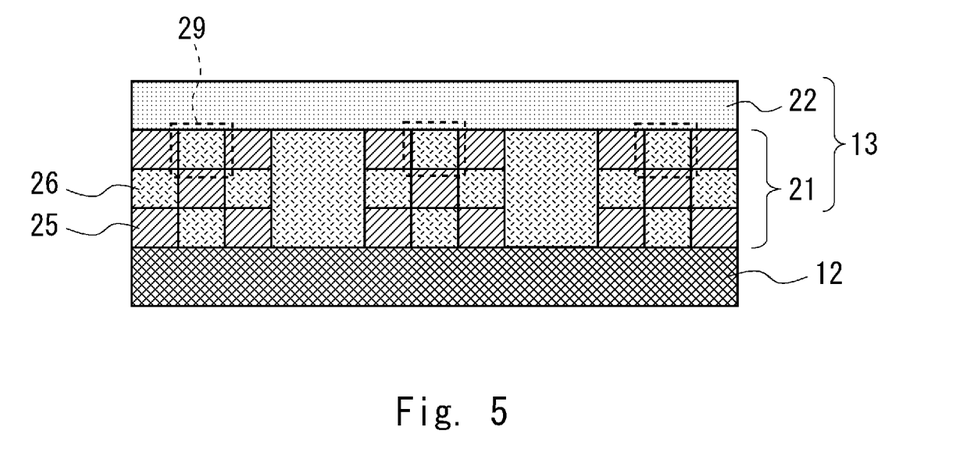
FIG. 5 is a cross-sectional diagram showing an example of a solid electrolyte layer included in a solid electrolytic capacitor according to an embodiment.

Similarly, although there are voids 27 at the interface between the first and second layers 21 and 22 in a scattered manner in the structure shown in FIG. 3, the second conductive polymer 26 may be disposed in the voids 27 as shown in FIG. 5 (the parts in which the second conductive polymer 26 is disposed in the voids 27 are indicated by broken lines denoted by a reference numeral 29). When the second conductive polymer 26 is disposed in the voids 27 as described above, the density of the first layer 21 can be further increased and hence the electrical resistance of the first layer 21 can be further reduced.

Next, a method for manufacturing a solid electrolytic capacitor according to this embodiment will be described.

The method for manufacturing a solid electrolytic capacitor according to this embodiment includes a step of forming a dielectric layer on an anode body made of a valve metal, a step of forming a solid electrolyte layer on the dielectric layer, and a step of forming a cathode body layer on the solid electrolyte layer. The step of forming the solid electrolyte layer includes: forming a first layer by forming, after forming a first conductive polymer on the dielectric layer by using chemical polymerization, a second conductive polymer composed of a self-doped-type conductive polymer; and forming a second layer containing a third conductive polymer on the first layer by using a suspension containing a conductive polymer doped with a polymer dopant. Further, the method is characterized in that when the solid electrolyte layer is formed, it is formed so that the first conductive polymer comes into contact with the third conductive polymer.

The method for manufacturing a solid electrolytic capacitor according to this embodiment will be described hereinafter in detail.

Figure 6:
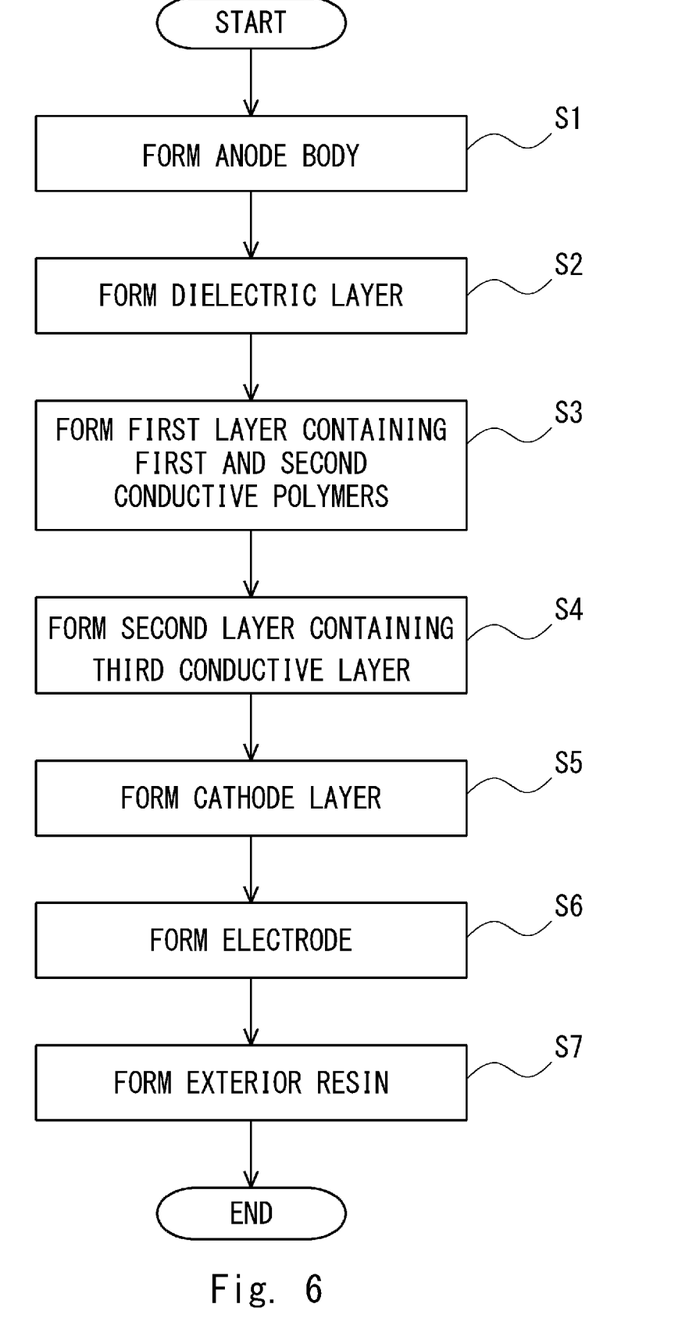
FIG. 6 is a flowchart for explaining a method for manufacturing a solid electrolytic capacitor according to an embodiment.

FIG. 6 is a flowchart for explaining the method for manufacturing a solid electrolytic capacitor according to this embodiment. The method for manufacturing a solid electrolytic capacitor will be described hereinafter with reference to FIGS. 1 and 2.

As shown in FIG. 6, when a solid electrolytic capacitor is manufactured, firstly, an anode body 11 is formed (Step S1). A valve metal can be used for the anode body 11. As the valve metal, the aforementioned materials can be used.

Next, a dielectric layer 12 is formed on the surface of the anode body 11 by anodizing the anode body (the valve metal) 11 (Step S2). After that, a first layer 21 containing a first conductive polymer 25 and a second conductive polymer 26 is formed on the dielectric layer 12 (Step S3).

Specifically, firstly, the first conductive polymer 25 is formed on the dielectric layer 12. A conductive polymer doped with a monomolecular dopant can be used for the first conductive polymer 25. For example, at least one substance selected from a group consisting of polypyrrole, polythiophene, polyaniline, and derivatives thereof can be used for the first conductive polymer 25. For example, the first conductive polymer 25 can be formed by using chemical polymerization.

As an example, the anode body 11 with the dielectric layer 12 formed thereon (hereinafter also referred to simply as the anode body 11) is immersed in an aqueous solution of iron(III) p-toluenesulfonate, and then dried to remove the moisture therefrom, so that a crystal of an oxidizer is formed on the dielectric layer 12. Next, the anode body 11 is immersed in an undiluted solution of 3,4-ethylene dioxythiophene and made to undergo a chemical polymerization reaction with the crystal of the oxidizer. After that, the anode body 11 is washed with water and alcohol, so that unreacted substances and the residue of the oxidizer are removed therefrom. Thorough the above-described series of processes, a porous (sponge-like) first conductive polymer 25 can be formed on the surface of the dielectric layer 12. Note that the above-described method for forming the first conductive polymer 25 is merely an example, and in this embodiment, the first conductive polymer 25 may be formed by using other methods.

Next, a second conductive polymer 26 is formed on the dielectric layer 12 on which the first conductive polymer 25 has already been formed. For the second conductive polymer 26, a self-doped-type conductive polymer containing a plurality of side chains containing a functional group that can be doped can be used. For example, the second conductive polymer 26 is a self-doped-type conductive polymer that is composed of polypyrrole, polythiophene, or polyaniline, and that contains a plurality of side chains containing a functional group that can be doped. That is, at least one conductive polymer selected from these self-doped-type conductive polymers can be used for the second conductive polymer 26.

As an example, the anode body 11 in which the first conductive polymer 25 has been formed is immersed in a solution containing a material for a second conductive polymer 26, and dried at a predetermined temperature for a predetermined time, so that the second conductive polymer 26 can be formed. In this process, the voids of the first conductive polymer 25 are impregnated with the second conductive polymer 26. For the solution containing the material for the second conductive polymer 26, for example, an aqueous solution containing polyethylene dioxythiophene containing a sulfonic acid group, which is directly bonded to the skeleton of the polyethylene dioxythiophene, can be used. Note that the above-described method for forming the second conductive polymer 26 is merely an example, and in this embodiment, the second conductive polymer 26 may be formed by using other methods.

Next, a second layer 22 containing a third conductive polymer is formed on the first layer 21 containing the first and second conductive polymers 25 and 26 (Step S4). Note that, in this embodiment, the solid electrolyte layer 13 is formed so that the first conductive polymer 25 comes into contact with the third conductive polymer (the second layer 22).

A conductive polymer doped with a polymer dopant can be used for the third conductive polymer. For example, at least one substance selected from a group consisting of polypyrrole, polythiophene, polyaniline, and derivatives thereof, doped with a polymer dopant containing a sulfonic acid group, can be used for the third conductive polymer 22. As the polymer dopant, for example, polystyrene sulfonate, its derivative, or a copolymer of polystyrene sulfonate can be used.

As an example, the anode body 11 in which the above-described first layer 21 has already been formed is immersed in a suspension containing the third conductive polymer, and dried at a predetermined temperature for a predetermined time, so that a second layer 22 containing the third conductive polymer can be formed on the first layer 21.

Note that the above-described method for forming the second layer 22 is merely an example, and in this embodiment, the second layer 22 may be formed by using other methods.

After the second layer 22 is formed, a cathode layer 16 is formed (Step S5). The cathode layer 16 can be formed, for example, by laminating a carbon layer and a silver layer.

Next, lead frames (electrodes) 20a and 20b are formed (Step S6). Specifically, the lead frame 20a is connected to the anode lead 18 by using welding. Further, the lead frame 20b is connected to the cathode layer 16 by using a conductive adhesive 17.

After that, an exterior resin 19 is formed (Step S7). Note that the exterior resin 19 is formed so that parts of the two lead frames 20a and 20b are exposed to the outside. There are no particular restrictions on the resin used for the exterior resin 19. For example, a thermosetting epoxy resin or a method for curing a liquid resin can be used.

It is possible to manufacture a solid electrolytic capacitor according to this embodiment by using the method for manufacturing a solid electrolytic capacitor described above.

As described in the background section, conductive polymers have been widely used as solid electrolytes of solid electrolytic capacitor. For example, a conductive polymer can be formed on a dielectric layer by using chemical polymerization. However, when a conductive polymer is formed on a dielectric layer by using chemical polymerization, the dielectric layer could be damaged and hence the insulation thereof could deteriorate. When the insulation of the dielectric layer deteriorates as described above, it may cause a dielectric breakdown.

For example, it is possible to suppress the deterioration of the insulation of a dielectric layer by reducing the number of times chemical polymerization is performed. However, when the number of times chemical polymerization is performed is reduced, the conductivity of the solid electrolyte layer decreases, causing a problem that the equivalent series resistance (ESR) of the solid electrolytic capacitor increases.

In this embodiment, the solid electrolyte layer 13 is formed by using the first and second layers 21 and 22. Further, the first layer 21 is formed by using the first conductive polymer 25 doped with a monomolecular dopant and the second conductive polymer 26 composed of a self-doped-type conductive polymer containing a plurality of side chains containing a functional group that can be doped. Further, the second layer 22 is formed by using the third conductive polymer doped with a polymer dopant. Note that the solid electrolyte layer is formed so that the first conductive polymer 25 comes into contact with the third conductive polymer (the second layer 22).

By the above-described structure, it is possible to minimize the amount of the first conductive polymer 25 (the conductive polymer doped with a monomolecular dopant) formed by the chemical polymerization while making up for the insufficient solid electrolyte with the second conductive polymer 26 composed of a self-doped-type conductive polymer. Therefore, it is possible to suppress the deterioration of the insulation of the dielectric layer 12 and thereby to prevent or reduce the decrease in the conductivity of the solid electrolyte layer 13. Further, in this embodiment, since the first conductive polymer 25 is in contact with the third conductive polymer (the second layer 22), the occurrence of the separation at the interface between the first and second layers 21 and 22 can be suppressed. Therefore, the increase in the ESR of the solid electrolytic capacitor can be suppressed. Therefore, it is possible to provide a solid electrolytic capacitor capable of suppressing the deterioration of the insulation of a dielectric layer and suppressing the increase in the ESR thereof, and a method for manufacturing such a solid electrolytic capacitor.

Figure 7:
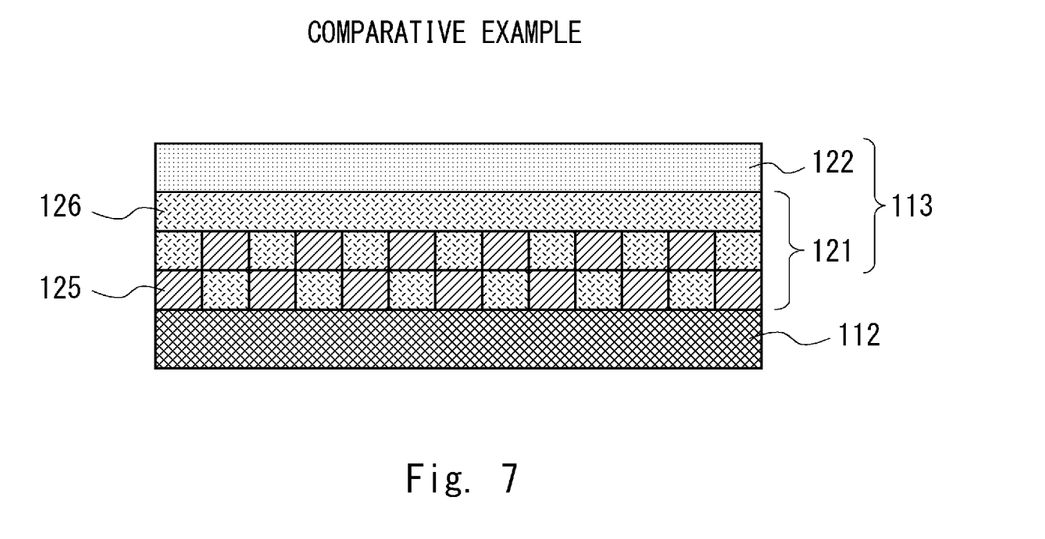
FIG. 7 is a cross-sectional diagram of a solid electrolyte layer included in a solid electrolytic capacitor according to a comparative example.

FIG. 7 is a cross-sectional diagram of a solid electrolyte layer included in a solid electrolytic capacitor according to a comparative example. In the comparative example shown in FIG. 7, a first layer 121 is formed, after forming a conductive polymer layer 125 on a dielectric layer 112 by using chemical polymerization, by forming a self-doped-type conductive polymer layer 126 so as to cover the conductive polymer layer 125. After that, a second layer 122 is formed on the first layer 121 by using a conductive polymer doped with a polymer dopant. The second layer 122 is formed by using a suspension of the conductive polymer. The first and second layers 121 and 122 constitute a solid electrolyte layer 113.

In the comparative example shown in FIG. 7, the entire surface of the self-doped-type conductive polymer layer 126 is in contact with the second layer 122 (the conductive polymer doped with a polymer dopant). The inventors of the present application have found that, in such a structure, interfacial separation occurs at the interface between the self-doped-type conductive polymer layer 126 and the second layer 122, so that the initial ESR of the product and the ESR thereof after a heat-resistance test increase.

Based on the above-described finding, in the present disclosure, the first conductive polymer 25 doped with a monomolecular dopant is in contact with the third conductive polymer (the second layer 22). By adopting this structure, it is possible to suppress the occurrence of the separation at the interface between the first and second layers 21 and 22. That is, since the first conductive polymer 25 has a sponge-like structure, it has an uneven surface. By bringing the first conductive polymer 25 having this uneven surface and the third conductive polymer 22 into contact with each other, the third conductive polymer 22 enters gaps (i.e., voids) in the first conductive polymer 25. As a result, the adhesive contact between the first conductive polymer 25 and the third conductive polymer 22 is improved, and hence the separation at the interface between the first and second layers 21 and 22 can be suppressed. Therefore, it is possible to suppress the increase in the initial ESR of the solid electrolytic capacitor and in the ESR thereof after a heat-resistance test.

EXAMPLES

The present disclosure will be described hereinafter in a more specific manner by using examples thereof, but the present disclosure is not limited to these examples.

Example 1

A sample according to an Example 1 was manufactured by a method described below (see FIG. 6).

Firstly, a tantalum sintered body was prepared by using a tantalum powder having a specific charge of 23,000 μFV/g. Specifically, firstly, a tantalum powder in which an anode lead (a tantalum wire) was embedded (i.e., buried) was press-molded. After that, this molded body was sintered at 1,500° C., so that a tantalum sintered body (an anode body) was prepared.

Next, the anode body was welded to a certain holder made of aluminum. Then, a dielectric layer ($Ta_2O_5$) was formed by immersing the anode body in an aqueous solution of phosphoric acid having a concentration of 0.05 wt % at a liquid temperature of 60° C., and anodizing it by applying a voltage of 70 V for 10 hours.

Next, the anode body on which the dielectric layer was formed (hereinafter referred to simply as the anode body) was immersed in an aqueous solution of iron(III) p-toluenesulfonate having a concertation of 30 wt %, and then dried to remove the moisture therefrom, so that a crystal of an oxidizer was formed on the dielectric layer. Then, this anode body was immersed in an undiluted solution of 3,4-ethylene dioxythiophene and made to undergo a chemical polymerization reaction with the crystal of the oxidizer. After that, the anode body was washed with water and alcohol, so that unreacted substances and the residue of the oxidizer were removed therefrom. Thorough the above-described series of processes, a porous (sponge-like) first conductive polymer (CH) was formed on the surface of the dielectric layer.

Next, the anode body on which the first conductive polymer (CH) was formed was immersed in a solution containing a material for a second conductive polymer (SD), and dried at 120° C. for 15 minutes, so that a second conductive polymer (SD) was formed. For the solution containing the material for the second conductive polymer (SD), an aqueous solution containing 1 wt % of polyethylene dioxythiophene containing a sulfonic acid group, which was directly bonded to the skeleton of the polyethylene dioxythiophene, was used. In this process, the second conductive polymer (SD) was formed so that it seeped into the voids of the first conductive polymer (CH).

Next, the anode body on which the first and second conductive polymers were formed was immersed in a suspension containing a third conductive polymer (SL), and dried at 120° C. for 15 minutes, so that a third conductive polymer (a second layer) was formed on the first and second conductive polymers (the first layer). An aqueous dispersion liquid of polyethylene dioxythiophene doped with polystyrene sulfonate was used for the third conductive polymer.

Next, the anode body on which the third conductive polymer (the second layer) was formed was immersed in a solution that was obtained by dispersing carbon particles and a binder resin in an organic solvent. Then, after the anode body was pulled out from the solution, the solvent was removed by heating the anode body, so that a carbon layer was formed thereon. Next, the anode body was immersed in a silver paste that was obtained by dispersing silver particles and a binder resin in an organic solvent. Then, after the anode body was pulled out from the solution, the solvent was removed by heating the anode body, so that a silver layer was formed thereon. In this way, the carbon layer and the silver layer were formed on the solid electrolyte layer. Note that either a thermosetting resin or a thermoplastic resin can be selected (i.e., used) as appropriate as the binder resin.

After the silver layer was formed, an anode lead was welded to an anode lead frame. Further, the silver layer and a cathode lead frame were fixed by using a conductive adhesive. After that, a solid electrolytic capacitor was manufactured by encapsulating them with an exterior resin.

Example 2

In an Example 2, a second conductive polymer (SD) was prepared by a method described below.

That is, an anode body on which a first conductive polymer (CH) was formed was immersed in a solution containing a material for a second conductive polymer (SD), and dried at 120° C. for 15 minutes, so that a second conductive polymer (SD) was formed. For the solution containing the material for the second conductive polymer (SD), an aqueous solution containing 2 wt % of polyethylene dioxythiophene containing a sulfonic acid group, which was directly bonded to the skeleton of the polyethylene dioxythiophene, was used. In this process, the second conductive polymer (SD) was formed so that it seeped into the voids of the first conductive polymer (CH).

After that, the excessive second conductive polymer (SD) formed on the surface of the first conductive polymer (CH) was removed by washing the anode body with water for 15 minutes and washing it with ethanol for 15 minutes.

The rest of the manufacturing method is similar to that in the Example 1.

Example 3

In an Example 3, a first conductive polymer (CH) was manufactured by a method described below.

That is, an anode body on which a dielectric layer was formed was immersed in an aqueous solution of iron(III) p-toluenesulfonate diluted to 10 wt %, and then dried to remove the moisture therefrom, so that a crystal of an oxidizer was formed on the dielectric layer. Then, this anode body was immersed in an undiluted solution of 3,4-ethylene dioxythiophene and made to undergo a chemical polymerization reaction with the crystal of the oxidizer. After that, the anode body was washed with water and alcohol, so that unreacted substances and the residue of the oxidizer were removed therefrom. Thorough the above-described series of processes, a porous (sponge-like) first conductive polymer (CH) was formed in an island-like pattern on the surface of the dielectric layer.

The rest of the manufacturing method is similar to that in the Example 1.

Example 4

In an Example 4, a second conductive polymer (SD) and a third conductive polymer (SL) were prepared by a method described below.

That is, an anode body on which a first conductive polymer (CH) was formed was immersed in a suspension containing a third conductive polymer (SL). In this process, the anode body was immersed in such a manner that the suspension did not come into contact with the surface of the anode body under which an anode lead (a tantalum wire) was embedded (i.e., buried). After that, a third conductive polymer (SD) was formed on the first conductive polymer (CH) by drying the anode body at 120° C. for 15 minutes.

After that, 1 μL of a solution containing a material for a second conductive polymer (SD) was injected onto the surface where the anode lead was embedded (i.e., the surface where the first conductive polymer (CH) was not covered by the third conductive polymer (SL)) by using a syringe, and dried at 120° C. for 15 minutes. As a result, the second conductive polymer (SD) was formed in such a manner that the second conductive polymer (SD) spread over the all the voids of the first conductive polymer (CH) and the second conductive polymer (SD) came into contact with the third conductive polymer (SL). For the solution containing the material for the second conductive polymer (SD), an aqueous solution containing 2 wt % of polyethylene dioxythiophene containing a sulfonic acid group, which was directly bonded to the skeleton of the polyethylene dioxythiophene, was used.

The rest of the manufacturing method is similar to that in the Example 2.

Comparative Example 1

As a Comparative Example 1, a solid electrolytic capacitor including a solid electrolyte layer in which a first conductive polymer (CH) is not in contact with a third conductive polymer (SL) (which corresponds to the structure shown in FIG. 7) was manufactured. Specifically, the number of times the anode body was immersed in the solution containing the material for the second conductive polymer (SD) was increased, so that the second conductive polymer (SD) was formed so as to entirely cover the first conductive polymer (CH). Note that the state in which the second conductive polymer (SD) entirely covered the first conductive polymer (CH) was checked (i.e., observed) by using an electron microscope. The rest of the manufacturing method is similar to that in the Example 1.

Evaluation of Samples

The ESRs of the solid electrolytic capacitors according to the Examples 1 to 4 and that according to the Comparative Example 1 manufactured as described above were measured by a procedure described below.

Firstly, the initial ESR of each sample at a frequency of 100 kHz was measured by using a four-terminal measurement-type LCR meter at a room temperature. Next, as a heat-resistance test, a rated voltage was applied to each sample at a temperature of 105° C. for 1,000 hours. After that, the ESR was measured by a method similar to the above-described method. Table 1 shows the results or the measurement. Note that the initial ESRs in the Table 1 were normalized so that the value of the initial ESR of the Example 1 become one. For example, the initial ESR of the Example 2 was 1.02, which means that the initial ESR value of the Example 2 was 1.02 times larger than that of the Example 1. The same applies to the initial ESR values of the Examples 3 and 4 and that of the Comparative Example 1. Further, the column "ESR Changing Rate after Heat-Resistance Test" in the Table 1 indicates, for each sample, the changing rage from the initial ESR (=(ESR Value after Heat-Resistance Test)/(Initial ESR Value)).

TABLE 1

| | Initial ESR | ESR Changing Rate after Heat-Resistance Test |
|---|---|---|
| Example 1 | 1 | 1.50 |
| Example 2 | 1.02 | 1.52 |
| Example 3 | 1.05 | 1.45 |
| Example 4 | 0.97 | 1.46 |
| Comparative Example 1 | 1.20 | 2.00 |

As shown in the Table 1, the initial ESRs and the changing rates of ESRs after the heat-resistance tests of the Examples 1 to 4 were smaller than those of the Comparative Example 1. Since the first conductive polymer (CH) has a sponge-like structure, it has an uneven surface. By bringing the first conductive polymer (CH) having this uneven surface and the third conductive polymer (SL) into contact with each other, the third conductive polymer (SL) enters gaps (i.e., voids) in the first conductive polymer (CH). It is considered that, as a result, the adhesive contact between the first conductive polymer (CH) and the third conductive polymer (SL) was improved, and hence the separation at the interface between the first and second layers could be suppressed.

Further, the changing rate of the ESR after the heat-resistance test was excellent in the Example 4. The reason for this excellent changing rate is probably as follows. That is, by bringing the first conductive polymer (CH) and the third conductive polymer (SL) into contact with each other before the second conductive polymer (SD) was formed, the contact area between them could be increased. Further, another conceivable reason is as follows. That is, since the second conductive polymer (SD) and the third conductive polymer (SL) also came into contact with each other in addition to the contact between the first conductive polymer (CH) and the third conductive polymer (SL), wide conductive paths could be secured in the solid electrolyte layer and hence the initial ESR value was also reduced.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

The invention claimed is:

1. A method for manufacturing a solid electrolytic capacitor comprising:
    forming a dielectric layer on an anode body made of a valve metal;
    forming a solid electrolyte layer on the dielectric layer; and
    forming a cathode body layer on the solid electrolyte layer, wherein
    the forming of the solid electrolyte layer comprises:
    forming a first layer by forming, after forming a first conductive polymer on the dielectric layer by using chemical polymerization, a second conductive polymer composed of a self-doped-type conductive polymer;
    removing excessive second conductive polymer formed on the surface of the first conductive polymer by washing the first layer; and
    forming a second layer containing a third conductive polymer on the first layer by using a suspension containing a conductive polymer doped with a polymer dopant, wherein
        the first conductive polymer has a sponge-like structure, and
        when the second layer is formed, the third conductive polymer enters into voids of the sponge-like structure of the first conductive polymer so that the first conductive polymer comes into contact with the third conductive polymer.

* * * * *